Feb. 15, 1966   C. A. TOLSON   3,235,247
REMOTELY CONTROLLED CLOSURES
Filed May 2, 1962   4 Sheets-Sheet 1

INVENTOR.
Clyde A. Tolson

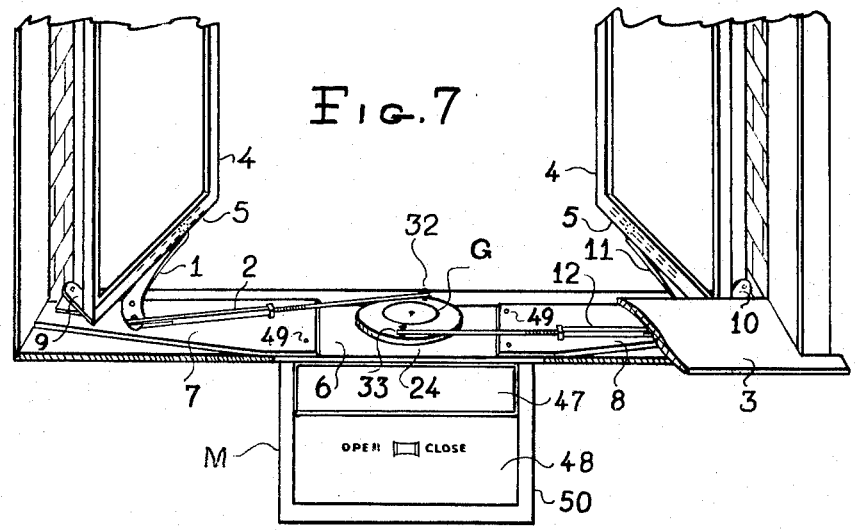

INVENTOR.
Clyde A. Tolson

United States Patent Office 3,235,247
Patented Feb. 15, 1966

3,235,247
REMOTELY CONTROLLED CLOSURES
Clyde A. Tolson, 4000 Massachusetts Ave. NW.,
Apt. 1316, Washington 16, D.C.
Filed May 2, 1962, Ser. No. 191,862
2 Claims. (Cl. 268—118)

The present invention relates to remotely controlled closures, such as windows, doors, and the like, and has for its principal object the provision of such closures which may be operated from one or more remotely located sensing devices, each of which, in turn, may operate one or more of the closures in response to any of various selected predetermined conditions. For example, in winter it may be desired to open and close a bedroom window by manual push buttons from a remote control position located at bedside, thus permitting operation of the window after retiring in the evening and before arising in the morning. Alternatively, it may be desired to have a window closed automatically by a time sensing control, set to close the window at a predetermined time before awakening time, thus permitting the bedroom to be brought to a comfortable temperature prior to arising; or, it may be desired to have a window or door close automatically upon the response of a suitable sensing detector to the onset of rain, wind, or any other selected weather condition which might logically require closing of windows or doors.

It is a further object of the invention to provide programming and priority-determining means to coordinate the over-all operation of such closures under the control of the remotely located sensing devices.

With the foregoing general objects in view, the invention consists in the novel combinations and arrangements of features as will be hereinafter more fully described, illustrated in the accompanying drawings, and defined in the appended claims.

In the accompanying drawings wherein are illustrated different practical embodiments of the invention and wherein like characteristics of reference denote corresponding parts in related views:

FIGURE 7 is a partially perspective view of one embodiment of the invention suitable for application to conventional casement-type windows.

FIGURE 8 is a partially perspective view of a motor actuating mechanism suitable for use in the arrangement of FIGURE 7.

Figure 1:
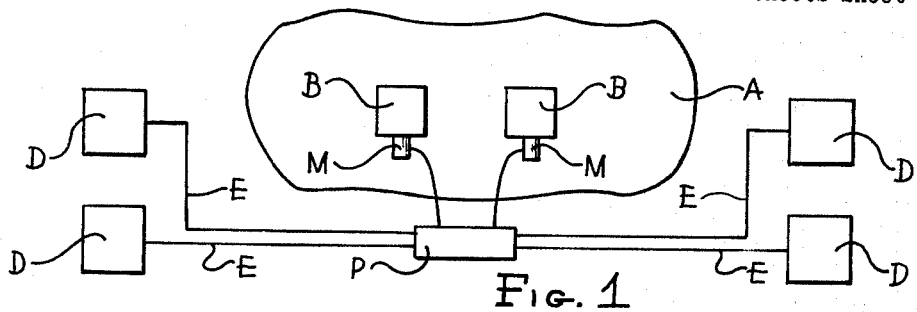
FIGURE 1 is a diagrammatic view illustrating the general over-all principle of the invention.

Referring to the drawings in detail, and specifically to FIGURE 1, A represents generally a portion of a wall or other enclosure, containing one or more closures B (such as windows), each of which may be opened or closed by respective associated motor devices M. Motor devices M, in turn, are controlled by remote sensing devices D over suitable energy paths E, under the over-all control of programmer P.

Figure 2:
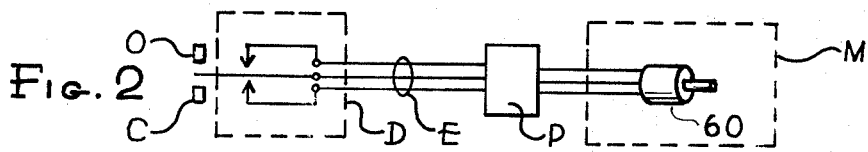
FIGURE 2 is a diagrammatic view illustrating a manual push button sensing remote control, together with a motor actuating unit suitable for use in the arrangement shown in FIGURE 1.

Referring now to FIGURE 2, there is shown at D a remote control sensor consisting of a single pole, three-position normally open switch, responsive to manual operation of push buttons O and C (for opening and closing, respectively). This remote control is suitable for use in the arrangement shown in FIGURE 1. Energy path E consists of three wire conductors leading to actuating motor device M consisting in this instance of a reversible motor 60. Actuation of push button O causes motor M to turn in a direction opening its associated closure B (of FIGURE 1), whereas actuation of push button C serves to operate the motor in the reverse direction.

Figure 3:
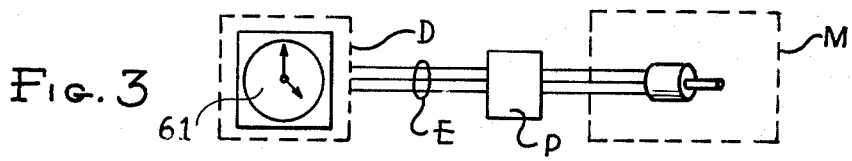
FIGURE 3 is a diagrammatic view illustrating a time control sensing device, together with actuating motor suitable for use in the arrangement of FIGURE 1.

Referring now to FIGURE 3, there are shown an alternative remote control sensing device D and motor device M suitable for use in the embodiment of FIGURE 1. Sensing device D in this instance consists of a time clock 61, connected to motor device M by a three-conductor wire energy path E. Time clock 61 may be set to actuate motor device M at any desired predetermined time.

Figure 4:
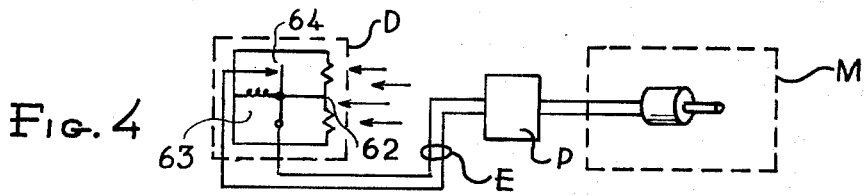
FIGURE 4 is a diagrammatic view illustrating a pressure responsive sensing device, together with actuating motor suitable for use in the arrangement of FIGURE 1.

In FIGURE 4, there is shown at D a wind pressure sensing device and related motor device M suitable for use in the embodiment of FIGURE 1. Sensor D in this instance consists of a wind pressure sensitive area 62 operating against spring loader 63 to close electrical contacts 64 upon rise of wind pressure to a predetermined value. Closing of contacts 64 thus actuates motor device M to operate its related closure B (of FIGURE 1).

Figure 5:
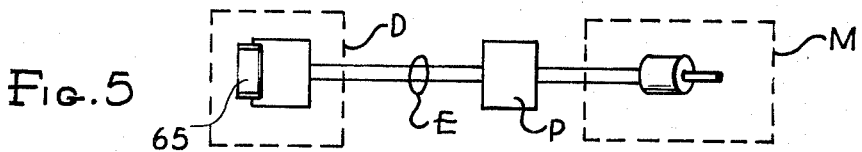
FIGURE 5 is a diagrammatic view illustrating a water sensitive remote control device, together with an actuating motor suitable for use in the arrangement of FIGURE 1.

Referring now to FIGURE 5, there is shown at D still a different type of sensing device, together with associated motor device M suitable for use in the arrangement of FIGURE 1. Sensor D in this instance consists of an element 65 whose resistance value decreases to a very low value upon the application of water to element 65; thus, when sensing element D is struck by raindrops, the related motor device M is thereupon caused to operate in such a direction as to close the related closure B (of FIGURE 1).

Figure 6:
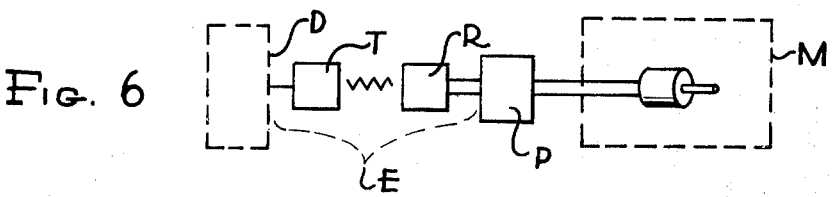
FIGURE 6 is a diagrammatic view illustrating the use of suitable energy transducers between the remote sensing device and the actuating motor.

While wire paths are shown in FIGURES 2 through 5, it will be apparent to those skilled in the art that energy paths E may equally well be of any other suitable nature, such as an ultrasonic sound beam, a radio signal, a light beam, and the like, provided that suitable transmitter transducer T and receive transducer R are inserted in the energy path as shown in FIGURE 6. Transducers T and R, of course, are selected to transmit and receive the desired type of energy for a portion of the energy path between D and M.

Although the invention is applicable to any desired type of closure, there is shown in detail in FIGURES 7 through 11 one practical embodiment of the invention as applied to conventional casement-type windows.

Referring now in detail to FIGURE 7, there are shown at 4 casement window sashes in partially opened position, and window sill 3 partially cut away. Windows of the casement type are normally opened and closed manually by bell crank and lever assemblies through which motion is imparted separately to each window sash 4 by lever movement in a raceway 5 provided at the bottom of each window sash. The present invention includes the substitution, in lieu of the normal manual means, of a window actuating motor mechanism M whose bell crank levers 1 and 11 may operate in existing window raceways 5 and to which levers power is supplied through connecting links 2 and 12 attached to driving cam assembly G. This window actuating mechanism is assembled on a base plate 6, to which base-plate extensions 7 and 8 are attached by connectors 49, readily adapting the mechanism to a variety of window sizes. Levers 1 and 11 and sash hinges 9 and 10 are mounted on base-plate extensions 7 and 8. Adjustable connecting links 2 and 12 provide power coupling from cranks 32 and 33 of driving cam 24 to levers 1 and 11, so that upon rotation of cam 24 in one direction windows 4 are opened and upon rotation of cam 24 in the opposite direction windows 4 are closed. Appropriate driving means for cam assembly G are located within compartment case 50, and covered by hinged panel 47 and fixed panel 48.

Referring now to FIGURE 8, there is shown in detail the driving means for cam assembly G. To the bottom side of base plate 6 is attached motor base plate 13 by means of stand-offs 51. Motor base 14 is attached to plate 13 by hinge 15 and is normally held firmly against plate 13 by the tension of springs 16 applied between base plate 13 and studs 17 anchored to motor base 14. This mounting permits disengaging of motor 39 from cam assembly G by the rotation of manual shift lever 18 in a counterclockwise direction, thereby applying the pressure of cam 19 against stud 20 anchored in motor base plate 13 and thereby separating sections of spline 21 which normally connect the motor with cam 24.

With the sections of spline 21 separated as shown in FIGURE 8, the windows are capable of being opened and closed by hand, since they are now free of the locking effect which would otherwise be provided by the high reduction gear ratio of the gears in gear box 52 connecting motor 39 to spline 21. However, with the manual lever 18 moved in the clockwise direction, spline sections 21 are engaged, and driving cam 24 is then operated by motor 39 through spline shaft 83. P designates the programmer.

Figure 9:
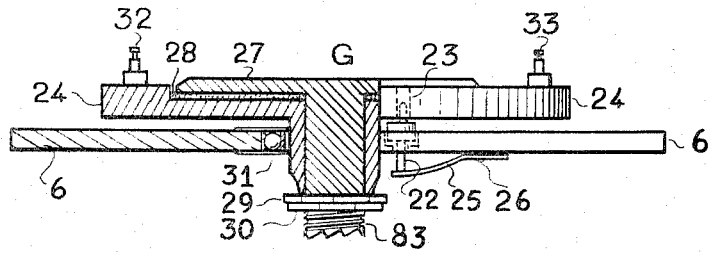
FIGURE 9 is a side elevation view, partly in section, showing details of the clutch mechanism and driving cam of FIGURE 8.

Referring now to FIGURE 9, which shows a partially cutaway view of cam assembly G, it will be noted that the cam assembly G is mounted to base plate 6 by means of bearing 31. Spline shaft 83 is rigidly connected to a clutch plate 27 which, in turn, transmits power through clutch lining 28 to driving cam 24. Pressure on clutch lining 28 is regulated by the adjustment of locking nuts 29 and 30 on threaded portion of spline shaft 83, to limit torque applied to cam 24 to a nondestructive value.

When sections of spline 21 are disengaged as described above in relation to FIGURE 8, it was pointed out that the windows could be opened and closed manually. In order to provide a locking device to permit locking the windows in the closed position or in the fully open position when being operated manually, locking holes 23 have been provided in cam 24 at appropriate locations, and the locking function is provided by locking pin 22 as shown in FIGURE 9 which protrudes through base plate 6 into one of the locking holes 23. Locking pin 22 is held into locking position by spring 25 which may be rotated into this locking position about retaining pin 26. With locking pin 22 in the raised position shown in FIGURE 9, cam 24 cannot be rotated and the windows are, therefore, fixed in the position determined by the relative position of cam 24 with respect to base plate 6. Access to the manual shift lever 18 and locking pin 22 is had by opening hinged panel 47 shown in FIGURE 7.

Figure 10:
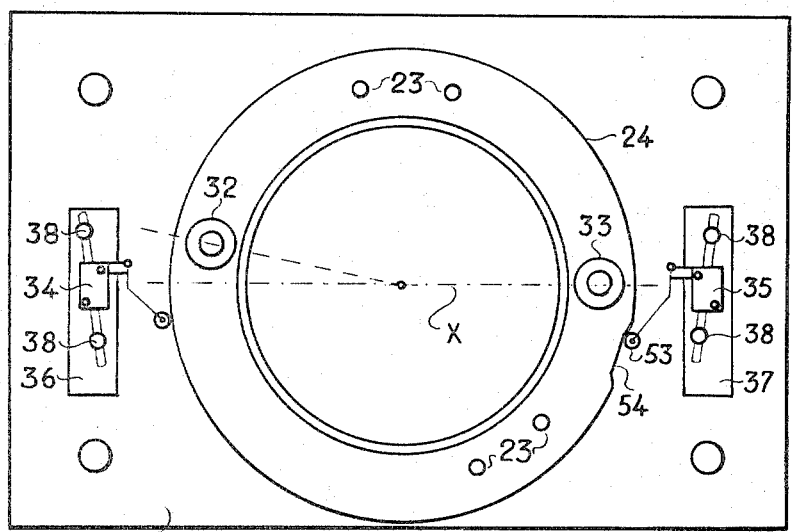
FIGURE 10 is a plan view of the driving cam assembly of FIGURE 8 showing in detail the mechanical construction and the relative placement of electrical limiting switches.

Referring now to FIGURE 10, it will be noted that a unique feature of driving cam 24 is the placement of cranks 32 and 33 off dead center with respect to each other. Such placement permits opening and closing of overlapping type casement windows by affording greater initial lineal motion to one bell crank lever than to the other, depending upon direction of rotation, and placement of levers 1 and 11 in respect to axis X. For example, with cam 24 in the position as shown in FIGURE 10, rotation of cam 24 about its center imparts to crank 32 a component of motion parallel to axis shown at X, whereas crank 33, moving at right angles to axis X necessarily has zero component parallel to the X axis. This will insure that the overlapping window driven by the bell crank lever connected to crank 32 in the opening (clockwise rotation of cam 24) will move in advance of the overlapped window driven by bell crank lever 11 connected to crank 33 by link 12 as shown in FIGURES 7 and 8. Upon closing (counterclockwise rotation of cam 24) the relationship of the sash movements to each other is reversed, thus insuring that the overlapped sash closes sufficiently in advance of the overlapping sash to avoid binding or jamming of the two sashes. While the angular displacement off dead center is dependent to some extent upon shape of associated bell cranks, an angular displacement of approximately 15 degrees is satisfactory.

Referring further to FIGURE 10, it will be noted that operating off driving cam 24 there are located an opening microswitch 34 and a closing microswitch 35 which interconnect the mechanical and related electrical systems in order to limit the opening and closing movement of the cam 24 and, therefore, of the windows which the cam drives. Closing microswitch 35 mounted on bracket 37 is adjustable by bolts 38 for positioning at a point where driving cam 24 will permit release of the closing microswitch 35 when cam 24 reaches a position corresponding to a fully closed position of the related window sashes. Release of the microswitch 35 is accomplished when roller 53 falls into notch 54 of the cam. By release of the microswitch is meant causing the microswitch to form an open circuit. Opening microswitch 34 mounted on bracket 36 is similarly adjustable by bolts 38 to position it for desired maximum opening of the window sashes at which point driving cam 24 will permit release of the opening microswitch 34 in the manner similar to that described above for microswitch 35.

Figure 11:
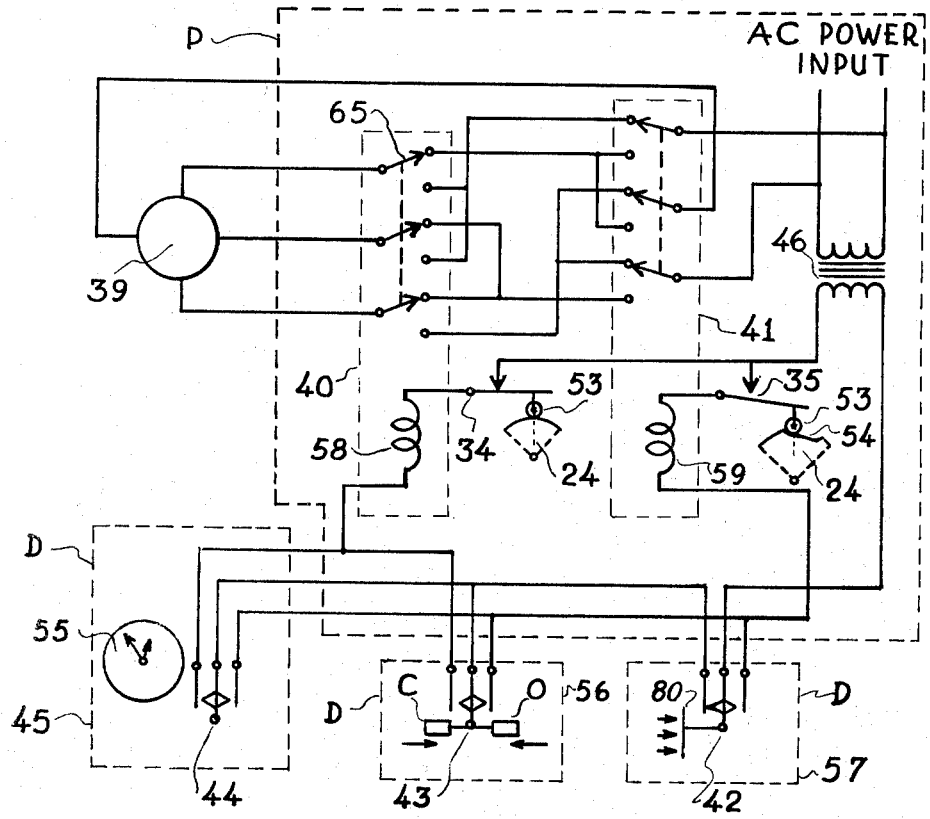
FIGURE 11 is a schematic diagram of an electrical programmer suitable for use in the embodiment shown in FIGURE 7.

Referring now to FIGURE 11, which is primarily a schematic diagram of a simple programmer suitable for use with the mechanical and electrical system shown in FIGURES 7 through 10, there is shown at 45 a remote control sensing device consisting of a three-position normally open switch 44 which in this instance is under the control of an associated time clock 55. At 56 is shown another remote control sensing device consisting of a three-position normally open switch 43, which in this instance is responsive to operation of associated push buttons O (open) and C (close). At 57 is shown still another remote control sensor consisting of a two-position single pole double throw switch 42 having one side normally closed and the other side normally open. Switch 42 in this instance is responsive to an associated wind pressure element 80 to open the normally closed circuit and to close the normally open circuit when the wind pressure on element 80 exceeds a predetermined value. It will be apparent to those skilled in the art that additional remote control sensing devices, either of the type shown or of types consisting of elements responsive to other conditions, such as rain, temperature and the like, can be added in the same manner as devices 45, 56, and 57. At 46 is shown a low-voltage transformer, the output of which is connected to relay winding 58 of opening relay 40 through remote sensing devices 45, 56 and 57, and through microswitch 34. Similarly, transformer 46 is connected to winding 59 of closing relay 41 through remote sensing devices 45, 56 and 57, and through the closing microswitch 35. At 39 is indicated a reversible electric motor (the physical location of which is shown in FIGURE 8). Relays 40 and 41 are shown in the normal position with coils 58 and 59 unenergized; microswitches 34 and 35 are shown in positions corresponding to a fully closed position of the window sashes.

Thus, upon movement of any one of the remote control sensing switches to the "open" position, as for example operation of switch 43 by push button O, coil 58 will be energized and the relay contacts 65 of the relay 40 will swing to the energized position, whereupon reversible motor 39 will be so connected as to turn in a direction to drive cam assembly G (of FIGURES 7 and 8) in the clockwise direction, thus opening the windows and simultaneously operating microswitch 35. Upon release of push button O, the windows will remain at the position reached at the time of push button release, until such time as the motor is again activated by one of the remote sensing devices, or until the windows are moved manually as described earlier. For example, the windows may remain in the open positon until the operation of the time clock switch 44 energizes the winding 59 of the closing relay, whereupon motor 39 would be energized to turn the opposite direction and thereby close the windows.

It will be noted that in the simple programmer P shown in FIGURE 11, remote sensors 45 and 56 have equal priority of control, whereas remote sensor 57 exercises priority over both 45 and 56; that is, if the wind pressure is such that switch 42 is thrown to the activated position, then switches 43 and 44 are thereby rendered inoperative for such time as the pressure on element 80 is sufficient to keep switch 42 in the activated position. The practical effect of this is that if the windows should be open and a wind storm arises, the windows will be automatically closed in spite of any attempts by the time clock sensor 45 or the push button sensor 56 to open the windows. In the absence of such a wind storm the windows would be opened and closed as desired by push button sensor 56, or operated automatically on a predetermined time schedule by time sensor 45.

While a relatively simple programmer has been shown and described in order to illustrate one embodiment of the invention, the invention is not at all restricted to such simple programmers.

Although only a single window is shown for clarity, it is apparent that additional closures to the extent desired may be connected to and controlled by the same combination of programmer and remote control sensors.

While only certain specific embodiments of the invention have been illustrated and described to convey the general concept of the invention, it is to be understood that the same is readily capable of various other embodiments within its spirit and scope as defined in the appended claims.

What I claim as new and desire to secure by Letters Patent of the United States is as follows:

1. A remotely controlled closure system comprising at least one movable closure, electric motor means for moving the same to open and closed positions, and mechanical and electrical linkage means connecting said motor to said closure, and in which said mechanical linkage includes a cam carrying crank pins; connecting rods mounted at one end on said crank pins and at the other end on bell crank levers, said bell crank levers being also connected to said closure, whereby rotation of said cam in one direction causes said closure to open and rotation in the opposite direction of said cam causes said closure to close; a driven clutch member engaging said cam and providing both adjustable and releasable frictional torque to said cam; and means whereby said cam can be mechanically locked at predetermined positions; and further in which said electrical linkage includes limiting switches to limit the travel of said motor to terminal positions corresponding to preselected positions of said closure.

2. A remotely controlled closure system comprising at least one movable closure, electric motor means for moving the same to open and closed positons, and mechanical and electrical linkage means connecting said motor to said closure, and in which said mechanical linkage includes a cam carrying two crank pins located at an angle of other than 180° with respect to each other as measured at the center of rotation of said cam, and in which separate respective portions of said closure are driven by each of said crank pins, whereby the motion of that portion of said closure which is driven by the first of said crank pins is nonsymmetric with respect to the motion of that portion of the said closure which is driven by the second of said pins, thereby causing one of said portions of said closure to open in advance of the other and to close after the other of said closure portions as a result of rotation of said cam.

References Cited by the Examiner

UNITED STATES PATENTS

| | | | |
|---|---|---|---|
| 2,198,488 | 4/1940 | Smith | 160—5 |
| 2,316,309 | 4/1943 | Blain | 268—123 |
| 2,675,228 | 4/1954 | Baird et al. | 268—123 X |
| 2,684,239 | 7/1954 | Gaffney | 268—123 X |
| 2,759,725 | 8/1956 | Clark | 268—123 |
| 3,012,156 | 12/1961 | Simmons | 318—162 X |

HARRISON R. MOSELEY, *Primary Examiner.*

BENJAMIN BENDETT, *Examiner.*